United States Patent [19]

Schricker et al.

[11] Patent Number: 5,878,366
[45] Date of Patent: Mar. 2, 1999

[54] METHOD FOR DETECTING A POWERLOSS CONDITION OF A RECIPROCATING INTERNAL COMBUSTION ENGINE

[75] Inventors: David R. Schricker, Princeville; Julie A. Gannon, Peoria, both of Ill.

[73] Assignee: Caterpillar Inc., Peoria, Ill.

[21] Appl. No.: 676,548

[22] Filed: Jul. 9, 1996

[51] Int. Cl.$^6$ .......................... B60K 28/16; G01M 15/00
[52] U.S. Cl. .......................... 701/101; 701/84; 701/111; 123/436
[58] Field of Search .................... 701/71, 79, 82, 701/84, 87, 90, 99, 101, 110, 111; 73/116, 117.3; 123/436, 478, 414

[56] References Cited

U.S. PATENT DOCUMENTS

| | | | |
|---|---|---|---|
| 4,697,561 | 10/1987 | Citron | 123/339 |
| 5,109,695 | 5/1992 | James et al. | 73/117.3 |
| 5,176,118 | 1/1993 | Norota | 123/435 |
| 5,200,899 | 4/1993 | Ribbens et al. | 364/431.08 |
| 5,239,473 | 8/1993 | Ribbens et al. | 364/431.08 |
| 5,245,542 | 9/1993 | Itoh et al. | 701/84 |
| 5,278,760 | 1/1994 | Ribbens et al. | 364/424.1 |
| 5,365,780 | 11/1994 | Feldkamp | 73/117 |

*Primary Examiner*—Tan Q. Nguyen
*Attorney, Agent, or Firm*—James R. Yee; David M. Masterson; Kevin M. Kercher

[57] ABSTRACT

In one aspect of the present invention, a method for detecting a powerless condition of a reciprocating internal combustion engine is provided. The engine has a plurality of reciprocating components, at least one cylinder and a crankshaft. The method includes the steps of sensing angular velocity of the crankshaft and responsively producing an angular velocity signal and determining a rate of fuel supplied to the one cylinder and responsively producing a fuel rate signal. The method further includes the steps of determining an indicated torque for the one cylinder as a function of the angular velocity signal and the fuel rate signal and responsively producing an indicated torque signal. Further, the method includes the steps of determining a requested torque for the one cylinder as a function of the fuel rate signal and the angular velocity signal and responsively producing a requested torque signal. An indication of powerless of the one cylinder is determined as a function of the requested torque signal and the actual torque signal.

11 Claims, 4 Drawing Sheets

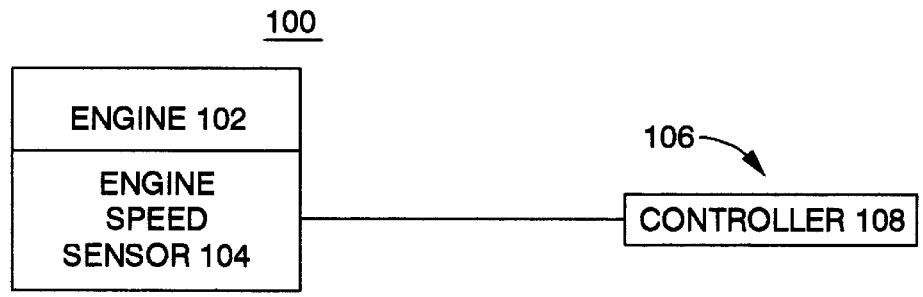
Fig_1_
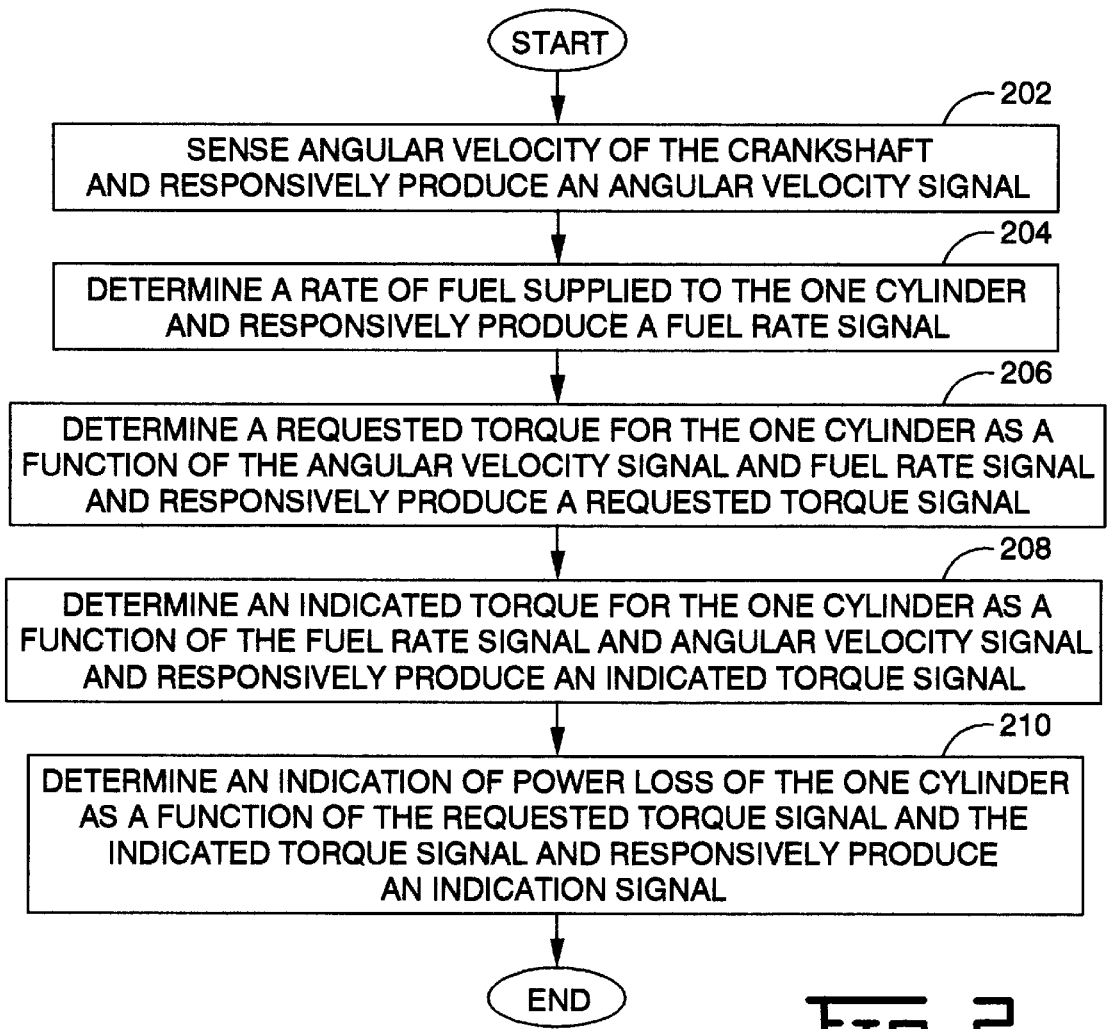
Fig_2_

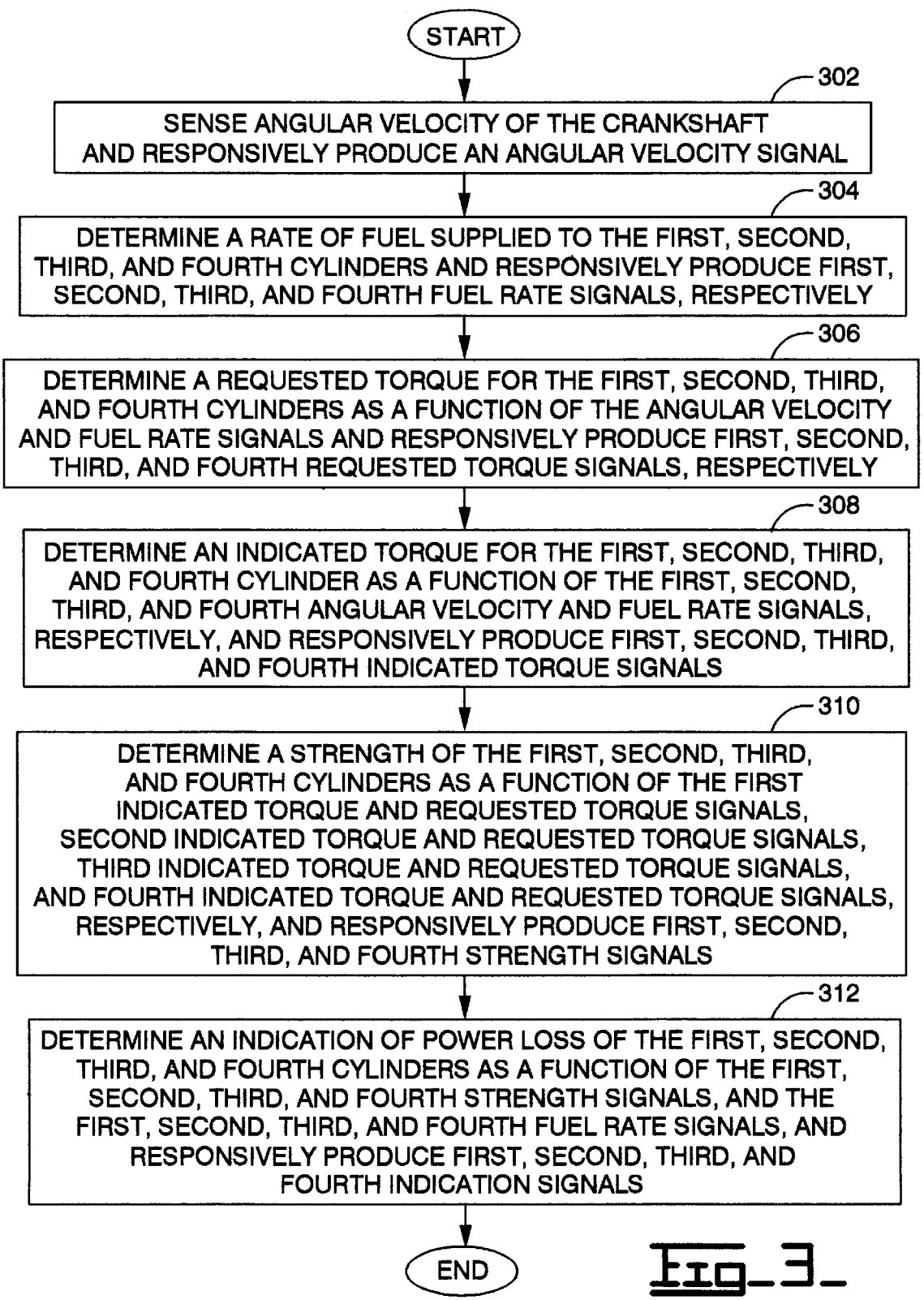
Fig_3

|  | TEST 1 | TEST 2 | TEST 3 | TEST 4 | TEST 5 |
|---|---|---|---|---|---|
| CYL #2 | 0.859 | 2.041 | 0.489 | 2.020 | -3.115 |
| CYL #4 | -0.214 | -0.555 | 3.765 | 1.323 | 1.168 |
| CYL #1 | -0.131 | 5.788 | 7.963 | 3.097 | 0.916 |
| CYL #5 | -0.042 | -1.380 | -1.590 | 2.675 | 1.320 |
| CYL #3 | -0.091 | 5.764 | 2.629 | 3.638 | -3.256 |
| CYL #6 | 0.136 | -0.612 | -2.106 | 4.288 | 10.879 |

Fig-4-

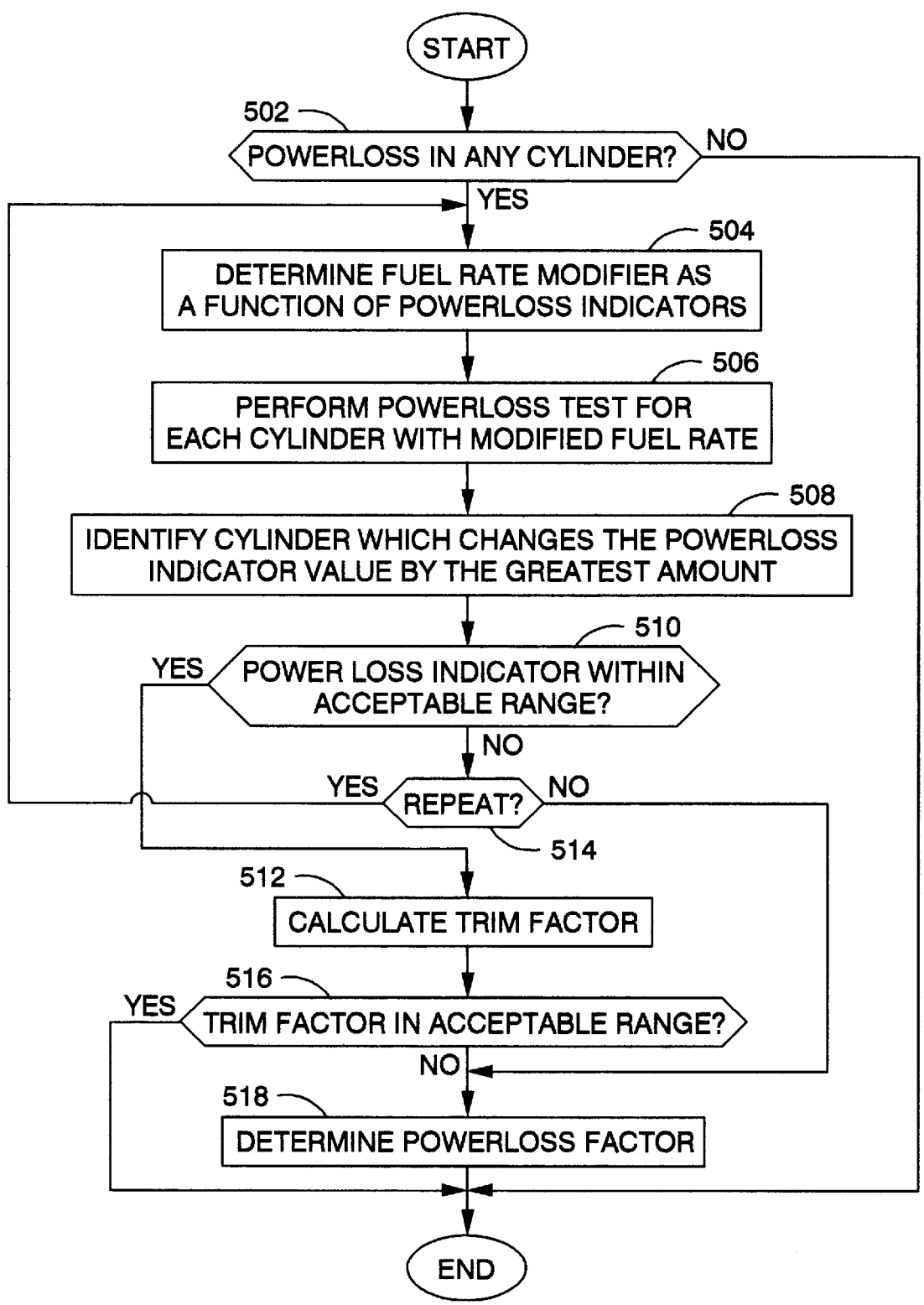
Fig_5_

METHOD FOR DETECTING A POWERLOSS CONDITION OF A RECIPROCATING INTERNAL COMBUSTION ENGINE

TECHNICAL BACKGROUND

The present invention relates generally to a reciprocating internal combustion engine, and more particularly, to a method for detecting a powerless condition of a reciprocating internal combustion engine.

BACKGROUND ART

Powerloss conditions in internal combustion engines present several problems, including increased downtime and excess exhaust emissions.

Additionally, government regulations are making more stringent demands or limits on the exhaust emissions of internal combustion engines (diesel or spark ignited). One of the causes of exhaust emissions are complete and/or partial misfires. Another cause of a powerless may be fuel injector clogging.

The present invention is aimed at solving one or more of the problems indicated above.

DISCLOSURE OF THE INVENTION

In one aspect of the present invention, a method for detecting a powerless condition of a reciprocating internal combustion engine is provided. The engine has a plurality of reciprocating components, at least one cylinder and a crankshaft. The method includes the steps of sensing angular velocity of the crankshaft and responsively producing an angular velocity signal and determining a rate of fuel supplied to the one cylinder and responsively producing a fuel rate signal. The method further includes the steps of determining an indicated torque for the one cylinder as a function of the angular velocity signal and the fuel rate signal and responsively producing an indicated torque signal. Further, the method includes the steps of determining a requested torque for the one cylinder as a function of the fuel rate signal and the angular velocity signal and responsively producing a requested torque signal. An indication of powerless of the one cylinder is determined as a function of the requested torque signal and the indicated torque signal.

BRIEF DESCRIPTION OF THE DRAWINGS

FIG. 1 is a diagrammatical illustration of an apparatus for detecting a powerless condition of an internal combustion engine;

FIG. 2 is a flow diagram of a method for detecting a powerloss condition of an internal combustion engine, according to an embodiment of the present invention;

FIG. 3 is a flow diagram of a method for detecting a powerless condition of an internal combustion engine, according to a second embodiment of the present invention;

FIG. 4 is a table of powerless indicator values provided by the present invention for a six cylinder engine.

FIG. 5 is a flow diagram of a method for detecting a powerless condition of an internal combustion engine, according to a third embodiment of the present invention.

BEST MODE FOR CARRYING OUT THE INVENTION

With reference to FIG. 1, the present invention provides a method for detecting a powerless condition of one of the cylinders of an engine 102. The powerless condition is indicative of individual cylinder degradation, e.g., due to a complete or partial misfire.

The method is embodied in an apparatus 100. The apparatus 100 includes an engine speed sensor 104 for sensing the angular speed of the crankshaft of the engine 102 and responsively producing an angular velocity signal.

A powerless of one of the cylinders is detected via a controlling means 106. In the preferred embodiment, the controlling means 106 includes a microprocessor controller 108.

The controller 108 receives the angular velocity signal from the engine speed sensor 104 and operates as discussed below to detect the powerless condition. Preferably, the engine 102 is operated via an electronic control module (not shown) which may be microprocessor based. The electronic control module (ECM) may provide other information used by the present invention as described below. The ECM and the controlling means 106 may reside on the same microprocessor-based controller 108.

With reference to FIG. 2, the operation of the present invention according to a first embodiment will now be discussed.

In a first control block 202, the angular velocity of the crankshaft is sensed and an angular velocity signal is produced.

In a second control block 204, the rate of fuel supplied to the one cylinder is determined and a fuel rate signal is produced. Preferably, the rate of fuel supplied to the one cylinder is received from the ECM.

In a third control block 206, a requested torque for one cylinder is determined as a function of the angular velocity signal and the fuel rate signal and a requested torque signal is produced.

In a fourth control block 208, an indicated torque for the one cylinder is determined as a function of the angular velocity and the fuel rate signal and an indicated torque signal is produced.

In a fifth control block 210, an indication of powerless of the one cylinder is determined as a function of the requested torque signal and the indicated torque signal and an indication signal is produced.

As discussed below, the indication of powerless of the one cylinder is determined by determining a strength of the one cylinder as a function of the indicated torque signal and the requested torque signal and responsively producing a strength signal. The indication signal is a function of the strength signal.

With reference to FIG. 3, the operation of the present invention according to a second embodiment will now be discussed. In the second embodiment, the engine 102 includes at least first, second, third, and fourth cylinders. Firing of the four cylinders occurs in a predetermined pattern.

In a sixth control block 302, the angular velocity of the crankshaft is sensed and an angular velocity signal is produced.

In a seventh control block 304, a rate of fuel supplied to the first, second, third, and fourth cylinders is determined and first, second, third, and fourth fuel rate signals are produced. Preferably, the rate of fuel supplied to the cylinders is received from the ECM.

In an eighth control block 306, a requested torque for the first, second, third, and fourth cylinders as a function of the fuel rate signal and the angular velocity signal is determined and first, second, third, and fourth requested torque signals are produced.

In the preferred embodiment, requested torque is determined by the equation:

$$REQUESTED\_TORQUE_N = f(FUEL\_RATE_N, RPM)$$

where the subscript N represents the respective cylinder, $REQUESTED\_TORQUE_N$ is the average torque requested of the Nth cylinder, and RPM is the average angular velocity of the crankshaft. Preferably, $FUEL\_RATE_N$ and RPM are averaged over M engine cycles. $REQUESTED\_TORQUE_N$ may be determined by a predetermined polynomial equation or a map.

In a ninth control block 308, an indicated torque is determined for the first, second, third, and fourth cylinders as a function of the first, second, third, and fourth fuel rate signals, and first, second, third, and fourth indicated torque signals are produced.

Preferably, the step of determining an indicated torque for the first, second, third, and fourth cylinders includes the step of receiving the angular velocity signal and the fuel rate signal, determining an acceleration of said crankshaft due to firing of the first, second, third, and fourth cylinders, and responsively producing respective first, second, third, and fourth acceleration signals.

In the preferred embodiment, the indicated torque is determined by the equation:

$$INDICATED\_TORQUE_N = CONSTANT\_J_N * (ACCELERATIO_N - BIAS_N) + AVERAGE\_ENGINE\_LOAD,$$

where $BIAS_N$ is a function of the Nth cylinder RPM and fuel rate and $AVERAGE\_ENGINE\_LOAD$ is a function of the engine speed and fuel rate. Preferably, $BIAS_N$ is determined via a look-up table. $ACCELERATION_N$ is the average acceleration of the crankshaft due firing of the Nth cylinder over M engine cycles and is a function of angular velocity.

In the preferred embodiment, $ACCELERATION_N$ is the numerical differentiation of the RPM signal between $\theta_1$ and $\theta_2$ with respect to the Nth cylinder, where $\theta_1$ is zero degrees after top dead center (TDC) of the Nth cylinder and $\theta_2$ is zero degrees after TDC of the next firing cylinder.

In a tenth control block 310, a strength of the first, second, third, and fourth cylinders is determined as a function of the first indicated torque and requested torque signals, second indicated torque and requested torque signals, third indicated torque and requested torque signals, and fourth indicated torque and requested torque signals and first, second, third, and fourth strength signals are responsively produced.

In the preferred embodiment, the strength of each cylinder is calculated by the equation:

$$STRENGTH_N = INDICATED\_TORQUE_N / REQUESTED\_TORQUE_N,$$

where N represents the respective cylinder, $REQUESTED\_TORQUE_N$ represents the requested torque for the cylinder and $INDICATED\_TORQUE_N$ represents the indicated torque for the cylinder.

In an eleventh control block 312, an indication of powerless of the first, second, third, and fourth cylinders as a function of the first, second, third, and fourth strength signals and the first, second, third, and fourth fuel rate signals are determined and first, second, third, and fourth indication signals are produced.

In the preferred embodiment, the indications of powerless of the first, second, third, and fourth cylinders are determined by the equation:

$$INDICATION_N = CONSTANT\_3_N + \\ ((CONSTANT\_4_N + (CONSTANT\_5_N * (MAX\_RACK_N - RACK_N))) * (CONSTANT\_6_N * (2 - STRENGTH_N)) * \\ (CONSTANT\_7_N + (CONSTANT\_8_N * (STRENGTH_{NEXT} - STRENGTH_N)))),$$

where N represents the current of the first, second, third, and fourth cylinders, $CONSTANT\_3_N$, $CONSTANT\_4_N$, $CONSTANT\_5_N$, $CONSTANT\_6_N$, $CONSTANT\_7_N$, $CONSTANT\_8_N$ are predetermined constants corresponding to the Nth cylinder, $MAX\_RACK_N$ is the maximum fuel rate signal for the next three consecutive cylinders in the firing sequence, $RACK_N$ is the fuel rate signal, $STRENGTH_{NEXT}$ is the strength of a next cylinder in the firing sequence, and $STRENGTH_N$ is the strength of the current cylinder.

In the preferred embodiment, the first, second, third, and fourth indication signals are compared with respective first, second, third, and fourth predetermined constants and a powerless signal is produced in response to one of the indication signals exceeding a respective predetermined constant. Preferably, the powerless signal is indicative of the cylinder which suffered the powerless.

With reference to FIG. 4, a set of tests were run. The test engine had six cylinders which fired in the following order:
cylinder #2
cylinder #4
cylinder #1
cylinder #5
cylinder #3
cylinder #6.

The results of five tests are illustrated. Each test had the following condition:
test #1: cylinders supplied with 100% fuel;
test #2: cylinder #1 with 25% less fuel injection duration
test #3: cylinder #1 with 50% less fuel injection duration
test #4: cylinder #6 with 25% less fuel injection duration
test #5: cylinder #6 with 50% less fuel injection duration.

FIG. 4 is a table showing the indicator values calculated for each test. As shown, the indicator values for the cylinders in which a fault was induced changed dramatically.

Tests have indicated that when a particular cylinder is out of specification by a minimal amount, positive identification of the out of specification cylinder is difficult. For example, in Test #2 cylinder #1 was set at 75% duration relative to the other cylinders. From the data, it is apparent that at least one of the cylinders has reduced power output. However, the data is inadequate to identify cylinder #1.

With reference to FIG. 5, the present invention provides a method for positively identifying a cylinder with a moderately small powerless if the cylinder cannot be identified by one of the methods described above.

In a first decision block 502, if a powerless is indicated in any of the cylinders (by one of the above methods), then control proceeds to a twelfth control block 504.

The following method increases the duration of each cylinder individually and performs a powerless test as described above to identify the cylinder which is performing improperly.

In the twelfth control block 504, a FUEL RATE MODIFIER is determined as a function of the last set of powerless indicator values. For example, the FUEL RATE MODIFIER may be selected from a table lookup based on the highest indicator value or the average of the N highest indicator values.

In a thirteenth control block 506, the powerless test is performed once for each cylinder where the duration of that cylinder is modified by the FUEL RATE MODIFIER.

In a fourteenth control block 508, after the test has been run for all cylinders, the cylinder which changes the powerloss indicator value by the greatest amount is identified.

In a second decision block 510, if the power loss indicator value for the cylinder identified in the previous step is in a predetermined range, then control proceeds to a fifteenth control block 512.

Otherwise control proceeds to a third decision block 514. In the third decision block 514, the cylinder causing the powerloss has not been identified. If the test is to be run again, then control returns to the twelfth control block 504. In the preferred embodiment, the test is run a predetermined number of times if the cylinder causing the powerloss cannot be detected.

In the fifteenth control block 512, a trim factor is calculated for the identified cylinder. The trim is calculated as a function of the FUEL RATE MODIFIER and any previously calculated trim factor. The trim factor may be used to compensate for the variance in the cylinder's injector fuel delivery characteristics.

In a fourth decision block 516, the trim factor is compared with a predetermined range. If the trim factor falls within the predetermined range, then the process ends. If the trim factor is outside of the predetermined range then control proceeds to a sixteenth control block 518. The predetermined range represents the acceptable range of trim values, i.e, injector duration cannot be modified beyond this range.

In the sixteenth control block 518, a powerless indication value is calculated as a function of a trim value and/or the FUEL RATE MODIFIER and the powerless values from the test.

Industrial Applicability

With reference to the drawings and in operation, the present invention provides a method for detecting a powerless condition of a cylinder of an internal combustion engine.

During operation and in real time, engine speed is sensed by a sensor and recorded by the controller 108. Using the sensed data, and other information from the ECM, an indication of a powerless condition for each cylinder is determined. Preferably, the indication is compared with a threshold to determine whether a powerless condition did in fact occur and in which cylinder.

After a powerless is detected, the operator may be notified by an onboard indicator light. The powerless signal may also be stored and/or transmitted to a base station. Thereafter, appropriate action, i.e., maintenance and/or repair may be scheduled.

Other aspects, features, and advantages of the present invention may be determined by a study of the specification, drawing, and appended claims.

We claim:

1. A method for detecting a powerless condition of a reciprocating internal combustion engine, the engine having a plurality of reciprocating components, at least one cylinder and a crankshaft, comprising:

sensing angular velocity of the crankshaft and responsively producing an angular velocity signal;

determining a rate of fuel supplied to the one cylinder and responsively producing a fuel rate signal;

determining a requested torque for the one cylinder as a function of said angular velocity signal and said fuel rate signal and responsively producing a requested torque signal;

determining an indicated torque for the one cylinder as a function of said fuel rate signal and angular velocity signal and responsively producing an indicated torque signal;

determining a strength of the one cylinder as a function of the indicated torque signal and the requested torque signal and responsively producing a strength signal; and, determining an indication of powerless of the one cylinder as a function of said strength signal and responsively producing an indication signal.

2. A method, as set forth in claim 1, wherein said strength of the one cylinder is determined by the equation:

$$STRENGTH = INDICATED\_TORQUE/REQUESTED\_TORQUE,$$

where REQUESTED_TORQUE represents the requested torque for the one cylinder and INDICATED_TORQUE represents the indicated torque for the one cylinder.

3. A method, as set forth in claim 1, wherein the step of determining an indication torque includes the step of receiving said angular velocity signal, determining an acceleration of said crankshaft due to firing of the one cylinder, and responsively producing an acceleration signal.

4. A method, as set forth in claim 3, wherein said indicated torque is determined by the equation:

$$CONSTANT\_J_N * (ACCELERATION_N - BIAS_N) + AVERAGE\_ENGINE\_LOAD,$$

where $BIAS_N$ is a function of said angular velocity signal and fuel rate signal and AVERAGE_ENGINE_LOAD is a function of the engine speed and fuel rate, $BIAS_N$ is determined via a look-up table, and $ACCELERATION_N$ is the average acceleration of the crankshaft due firing of the Nth cylinder over M engine cycles and is a function of said angular velocity signal.

5. A method for detecting a powerless condition of a reciprocating internal combustion engine having first, second, third, and fourth cylinders and a crankshaft, comprising:

sensing angular velocity of the crankshaft and responsively producing an angular velocity signal;

determining a rate of fuel supplied to the first, second, third, and fourth cylinders and responsively producing first, second, third, and fourth fuel rate signals, respectively;

determining a requested torque for the first, second, third, and fourth cylinders as a function of said angular velocity and fuel rate signals and responsively producing first, second, third, and fourth requested torque signals, respectively;

determining an indicated torque for the first, second, third, and fourth cylinder as a function of said first, second, third, and fourth fuel rate and angular velocity signals, respectively, and responsively producing first, second, third, and fourth indicated torque signals;

determining a strength of the first, second, third, and fourth cylinders as a function of said first indicated torque and requested torque signals, second indicated torque and requested torque signals, third indicated torque and requested torque signals, and fourth indicated torque and requested torque signals, respectively and responsively producing first, second, third, and fourth strength signals;

determining an indication of powerless of the first, second, third, and fourth cylinders as a function of said first, second, third, and fourth strength signals and responsively producing first, second, third, and fourth indication signals.

6. A method, as set forth in claim 5, including the steps of;

comparing said first, second, third, and fourth indication signals with first, second, third, and fourth predetermined constants; and producing a powerless signal in response to one of said indication signals exceeding a respective predetermined constant.

7. A method, as set forth in claim 5, wherein said strength of the first, second, third, and fourth cylinders are determined by the equation:

$$STRENGTH_N = INDICATED\_TORQUE_N / REQUESTED\_TORQUE_N,$$

where N represents the respective cylinder, $REQUESTED\_TORQUE_N$ represents the requested torque for the cylinder and $INDICATED\_TORQUE_N$ represents the indicated torque for the cylinder.

8. A method, as set forth in claim 5, wherein the step of determining an indicated torque for the first, second, third, and fourth cylinders includes the step of receiving said angular velocity signal, determining an acceleration of said crankshaft due to firing of the first, second, third, and fourth cylinders, and responsively producing respective first, second, third, and fourth acceleration signals.

9. A method, as set forth in claim 8, wherein said requested torque is determined by:

$$REQUESTED\ TORQUE_N = f(FUEL\ RATE_N, RPM),$$

where N represents the respective cylinder, $REQUESTED\ TORQUE_N$ is the average torque requested of the Nth cylinder, RPM is the average angular velocity of the crankshaft.

10. A method, as set forth in claim 5, wherein the first, second, third, and fourth cylinders are fired in a predetermined sequence and said indications of powerless of the first, second, third, and fourth cylinders are determined by the equation:

$$INDICATION_N = CONSTANT\_3_N + ((CONSTANT\_4_N +$$
$$(CONSTANT\_5_N * (MAX\_RACK_N - RACK_N))) *$$
$$(CONSTANT\_6_N * (2 - STRENGTH_N)) * (CONSTANT\_7_N +$$
$$(CONSTANT\_8_N * (STRENGTH_{NEXT} - STRENGTH_N)))),$$

where N represents the current of the first, second, third, and fourth cylinders, $CONSTANT\_3_N$, $CONSTANT\_4_N$, $CONSTANT\_5_N$, $CONSTANT\_6_N$, $CONSTANT\_7_N$, $CONSTANT\_8_N$ are predetermined constants corresponding to the Nth cylinder, $MAX\_RACK_N$ is the maximum fuel rate signal for the next three consecutive cylinders in the firing sequence, $RACK_N$ is the fuel rate signal, $STRENGTH_{NEXT}$ is the strength of a next cylinder in the firing sequence, and $STRENGTH_N$ is the strength of the current cylinder.

11. A method for detecting a powerless condition of a reciprocating internal combustion engine, the engine having a plurality of reciprocating components, a a plurality of cylinders and a crankshaft, comprising:

sensing angular velocity of the crankshaft and responsively producing an angular velocity signal;

determining a rate of fuel supplied to the one cylinder and responsively producing a fuel rate signal;

receiving said angular velocity and fuel rate signals and responsively calculating a powerless indicator value for each cylinder;

comparing said powerless indicator values and identifying a powerless condition;

if said powerless condition exists, identifying a cylinder causing said powerless based on said powerless indicator values; and, if said powerless causing cylinder cannot be identified, performing the following steps:

(a) calculating a FUEL RATE MODIFIER as a function of said powerless indicator values;

(b) repeat said powerless test once for all cylinders, while modifying the duration of a respective cylinder by said FUEL RATE MODIFIER for each test; and, (c) identify said powerless causing cylinder as a function of the powerless indicator values calculated during each test.

\* \* \* \* \*

UNITED STATES PATENT AND TRADEMARK OFFICE
CERTIFICATE OF CORRECTION

PATENT NO. : 5,878,366

DATED : March 2, 1999

INVENTOR(S) : Schricker, et al.

It is certified that error appears in the above-identified patent and that said Letters Patent is hereby corrected as shown below:

In the abstract, line 2, change "powerless" to --powerloss--.
In the abstract, line 17, change "powerless" to --powerloss--.

Column 5, line 58, change "powerless" to --powerloss--.
Column 6, line 11, change "powerless" to --powerloss--.
Column 6, line 40, change "powerless" to --powerloss--.
Column 7, line 1, change "powerless" to --powerloss--.
Column 7, line 10, change "powerless" to --powerloss--.
Column 7, line 43, change "powerless" to --powerloss--.
Column 8, line 18, change "powerless" to --powerloss--.

Column 8, line 27, change "powerless" to --powerloss--.
Column 8, line 29, change "powerless" to --powerloss--.
Column 8, line 30, change "powerless" to --powerloss--.
Column 8, line 31, change "powerless" to --powerloss--.
Column 8, line 32, change "powerless" (first occurrence) to --powerloss--.
Column 8, line 32, change "powerless" (second occurrence) to --powerloss--.
Column 8, line 34, change "powerless" to --powerloss--.
Column 8, line 37, change "powerless" to --powerloss--.
Column 8, line 38, change "powerless" to --powerloss--.
Column 8, line 41, change "powerless" to --powerloss--.

UNITED STATES PATENT AND TRADEMARK OFFICE
CERTIFICATE OF CORRECTION

PATENT NO. : 5,878,366
DATED : March 2, 1999
INVENTOR(S) : Schricker, et al.

It is certified that error appears in the above-identified patent and that said Letters Patent is hereby corrected as shown below:

Column 8, line 42, change "powerless" to --powerloss--.

Signed and Sealed this

Seventh Day of September, 1999

Attest:

Q. TODD DICKINSON

*Attesting Officer*  *Acting Commissioner of Patents and Trademarks*